(12) United States Patent
Hong et al.

(10) Patent No.: US 9,196,884 B2
(45) Date of Patent: Nov. 24, 2015

(54) SEPARATOR FOR LITHIUM SECONDARY BATTERY AND LITHIUM SECONDARY BATTERY COMPRISING THE SAME

(75) Inventors: Ji-Jun Hong, Seoul (KR); In-Beom Hwang, Seoul (KR); Sung-Tae Ko, Gyeryong Chungcheongnam-Do (KR); Kwang-Hyun Kim, Nonsan Chungcheongnam-Do (KR); Yoon-Jeong Heo, Nonsan (KR)

(73) Assignee: Kokam Co., Ltd., Siheung, Gyeonggi-do (KR)

( * ) Notice: Subject to any disclaimer, the term of this patent is extended or adjusted under 35 U.S.C. 154(b) by 0 days.

(21) Appl. No.: 13/469,866

(22) Filed: May 11, 2012

(65) Prior Publication Data

US 2012/0225344 A1    Sep. 6, 2012

Related U.S. Application Data

(63) Continuation of application No. PCT/KR2010/003423, filed on May 28, 2010.

(30) Foreign Application Priority Data

Nov. 16, 2009    (KR) .................. 10-2009-0110286

(51) Int. Cl.
*H01M 10/052* (2010.01)
*H01M 2/16* (2006.01)
*H01M 2/14* (2006.01)

(52) U.S. Cl.
CPC .......... *H01M 2/1653* (2013.01); *H01M 10/052* (2013.01); *Y02E 60/122* (2013.01)

(58) Field of Classification Search
CPC ... H01M 2/1653; H01M 2/14; H01M 2/1613; H01M 2/1686; H01M 10/052; H01M 2/1646
USPC .......................... 429/145, 144, 129, 141, 142
See application file for complete search history.

(56) References Cited

U.S. PATENT DOCUMENTS

| | | | | |
|---|---|---|---|---|
| 2004/0229120 A1* | 11/2004 | Hatta et al. | ..................... | 429/176 |
| 2006/0035152 A1* | 2/2006 | Nishimura et al. | ............ | 429/234 |
| 2010/0055563 A1* | 3/2010 | Nakanishi et al. | ............ | 429/209 |

FOREIGN PATENT DOCUMENTS

| | | | |
|---|---|---|---|
| JP | 2006229016 A | 8/2006 | |
| JP | 2007-048738 | * 2/2007 | .............. H01M 2/16 |

(Continued)

OTHER PUBLICATIONS

Form PCT/ISA/210 International Search Report for PCT/KR2010/003423 (WO2011/059154 A1).

*Primary Examiner* — Patrick Ryan
*Assistant Examiner* — Angela Martin
(74) *Attorney, Agent, or Firm* — Mintz Levin Cohn Ferris Glovsky and Popeo, P.C.; Kongsik Kim (57) ABSTRACT

Disclosed is a separator for a lithium secondary battery and a lithium secondary battery comprising the same. The separator may include a thermoplastic polyolefin-based polymer porous sheet and an aramid-based non-woven fabric sheet stacked on at least one surface of the polyolefin-based polymer porous sheet, wherein the polyolefin-based polymer sheet and the aramid-based non-woven fabric sheet are adhered with an adhesive, and the adhesive loses an adhesive performance at 80° C. or more to separate the two sheets. The separator has a shut-down function and excellent high-temperature shape stability.

11 Claims, 4 Drawing Sheets

(56) References Cited

FOREIGN PATENT DOCUMENTS

| JP | 2007048738 A | 2/2007 |
| JP | 2007157723 A | 6/2007 |
| JP | 2008-059966 * | 3/2008 ............ H01M 2/16 |
| JP | 2008059966 A | 3/2008 |

* cited by examiner

SEPARATOR FOR LITHIUM SECONDARY BATTERY AND LITHIUM SECONDARY BATTERY COMPRISING THE SAME

CROSS-REFERENCE TO RELATED APPLICATION(S)

This application is a continuation of International Application PCT/KR2010/003423 filed on May 28, 2010, which claims priority from Korean Patent Application No. 10-2009-0110286, filed on Nov. 16, 2009, the entire disclosure of which applications is incorporated herein by reference for all purposes.

BACKGROUND

1. Technical Field

The present invention relates to a separator for a lithium second battery and a lithium secondary battery comprising the same, and more particularly, to a separator for a lithium secondary battery that has a shutdown function and excellent high-temperature shape stability, and a lithium secondary battery comprising the same.

2. Description of the Related Art

With the rapid development of electronic, communication and computer industries, mobile electronic communication equipments, such as, for example, camcorders, mobile phones, laptop computers, and the like have been advancing remarkably. Accordingly, the demand for lithium secondary batteries as a power source of mobile electronic communication equipments is increasing day by day. In particular, recently, research and development has been actively made all over the world including Japan, Europe, USA as well as Korea to develop lithium secondary batteries as an environment-friendly power source of large-scale equipments, such as, for example, electric vehicles, uninterruptible power supplies, electromotive tools, satellites, and the like, as well as lithium secondary batteries as a power source of mobile electronic equipments.

Generally, a lithium secondary battery includes a cathode of lithium-transition metal composite oxide, an anode capable of intercalating or disintercalating lithium ions, a separator interposed between the cathode and the anode, and an electrolyte that helps the migration of lithium ions.

The main function of the separator is to separate the cathode from the anode and hold the electrolyte therein to provide high ion permeability. Recently, a separator having a shutdown function has been suggested, in which, for example, when a short circuit occurs in a battery, the separator melts to stop the pores so as to keep a large amount of electric current from flowing into the battery. Also, suggestions have been made to increase the area of a separator larger than those of cathode and anode plates to prevent the cathode and anode plates from contacting. However, in this case, the two electrode plates may contact when the separator shrinks with the increasing internal temperature. An additional function is required to prevent an internal short circuit caused thereby. In particular, in the case of a modern high capacity and high energy density lithium secondary battery, a separator having higher heat resistance and thermal stability than a conventional separator is needed because the temperature in the battery increases to a higher level than that of a general battery when the battery is repeatedly charged and discharged at a high rate.

Conventionally, a porous membrane formed of a sheet using a polyolefin-based polymer, such as, for example, polyethylene (PE) or polypropylene (PP) has been widely used as a separator. A separator made of polyethylene having a melting temperature of 130° C. or polypropylene having a melting temperature of 170° C. thermally shrinks/melts due to the heat generated when an excessive amount of electric current flows into a battery by a short circuit or an increase in the internal temperature by the effect of a certain external factor, and consequently stops the micropores to shut down the flow of electric current.

In addition to a shut-down function, shape stability is another important quality of a separator. When the temperature continues to increase above the melting temperature of polyethylene or polypropylene by internal/external factors even subsequent to shut-down, the separator melts and loses shape, which causes a short circuit of electrodes.

To solve this problem, a composite separator for a lithium secondary battery has been developed. For example, Japanese Patent Publication No. 2003-22794 discloses a jelly roll-type battery comprising a separator having a melt-bonded portion to suppress the shrinkage of the separator, thereby preventing a cathode and an anode from contacting. Also, Korean Patent Publication No. 2005-0066652 teaches a lithium secondary battery with different types of separators made of materials having different temperature characteristics, in which first and second separators surrounding an electrode assembly suppress a chain reaction at the anticipated time of an internal short circuit caused by the shrinkage of the separator as a consequence of the increasing temperature in the battery under high temperature condition, thereby ensuring the safety of the battery. However, this art needs additional heat fusion and repeated overlapping of separators during cell assembly, which results in a reduction in the procedural efficiency.

Korean Patent Publication No. 2002-0001035 discloses a composite membrane that is prepared by coating a non-porous film with an active material. However, a support layer has a relatively low melting temperature of 166.5° C. and the composite membrane has a relatively high air permeability of 560 sec/100 cc, which causes deterioration in the charging/discharging characteristics.

US Patent Publication No. 2006/0019154 A1 suggests a heat-resistant polyolefin-based separator with a porous heat-resistant resin thin film, in which a polyolefin-base separator is soaked in a solution of polyamide, polyimide, or polyamideimide having a melting point of 180° C. or more and then immersed in a coagulation solution to extract a solvent, thereby achieving small heat shrinkage, good heat resistance, and good cycling performance.

Japanese Patent Publication No. 2005-209570 discloses a polyolefin separator with a heat-resistant resin layer in which both surfaces of the polyolefin separator are coated with a solution of heat-resistant resin having a melting point of 200° C. or more, such as, for example, aromatic polyamide, polyimide, polyether sulfone, polyether ketone, or polyetherimide, followed by immersion in a coagulation solution, washing, and drying, so as to ensure sufficient safety under high energy density and high capacity conditions. However, the pores of the polyolefin separator get closed due to the impregnation with the heat-resistant resin, and thus the migration of lithium ions therethrough is limited, resulting in deterioration in the charging/discharging characteristics.

WO 2004/031466 relates to an improved laminate of aramid papers and a polyester polymer layer, preferably a laminate of two aramid papers separated by a polyester polymer layer. Also, WO 2006/101243 discloses a composite sheet with a shut-down function and high-temperature shape stability suitable as a separator for secondary batteries and capacitors, that has a layered structure of a porous thermoplastic polymer sheet layer having a melting point of 200° C.

or below and at least two non-woven fabric sheet layers of an organic compound not substantially having a safety melting point stacked on top of each other. However, the composite sheet of this art has a procedural difficulty in manufacturing and may have an uneven contact surface, which may increase the contact resistance of electrodes.

WO 2004/030909 discloses a method for forming a laminate of at least two layers of aramid paper and at least one layer of polymer, including calendering the opposing surfaces of the aramid paper at different temperatures before forming a laminate. However, because the aramid paper does not have a shut-down function, this art cannot shut down a flow of electric current caused by an external short circuit or heat generation, which may cause an even larger ignition.

SUMMARY OF THE INVENTION

It is an object of the present invention to provide a separator that has a shut-down function and small heat shrinkage, and achieves excellent heat resistance, ionic conductivity, and adhesive performance with electrodes.

It is another object of the present invention to provide a lithium secondary battery comprising such a separator that improves the safety while not deteriorating the electrochemical characteristics.

To achieve the objects of the present invention, provided is a separator for a lithium secondary battery including a thermoplastic polyolefin-based polymer porous sheet, and an aramid-based non-woven fabric sheet stacked on at least one surface of the polyolefin-based polymer porous sheet, wherein the polyolefin-based polymer porous sheet and the aramid-based non-woven fabric sheet are adhered with an adhesive, and the adhesive loses an adhesive performance at 80° C. or more to separate the two sheets.

A conventional multi-layered separator has a structure in which sheets are adhered by heat fusion or with an adhesive intended for a permanent use. In this case, as the internal temperature increases, the adhesive strength increases. When thermal deformation occurs in a certain sheet, the effect spreads over the entire separator so that the separator thermally deform as a whole.

However, the multi-layered separator of the present invention uses an adhesive that loses an adhesive performance at a predetermined temperature, and accordingly, even though thermal deformation occurs in a certain layer at a predetermined temperature or more, the separator can avoid the entire thermal deformation because each sheet is already separated.

When the temperature reaches a specific level, the thermoplastic polyolefin-based polymer sheet of the separator according to the present invention starts to melt and stops the micropores to perform a shut-down function.

Also, because the separator of the present invention has a sheet of aramid that is not liable to thermal deformation at a high temperature, that is, does not substantially have a safety melting point, the separator can have excellent high-temperature shape stability.

In the separator of the present invention, the polyolefin-based polymer sheet may be, but not limited to, at least one selected from the group consisting of polyethylene, polypropylene, polybutene, polymethylpentene, and copolymers thereof.

In the separator of the present invention, the polyolefin-based polymer sheet preferably has a melting point of 110 to 160° C., a porosity of 30 to 80%, and an air permeability of 100 to 400 sec/100 ml.

In the separator of the present invention, the aramid-based non-woven fabric sheet preferably has a porosity of 40 to 70% and an air permeability of 1 to 20 sec/100 ml, and the separator preferably has a porosity of 40 to 60% and an air permeability of 150 to 300 sec/100 ml as a whole.

The separator for a lithium secondary battery described above may be very useful in fabricating a lithium secondary battery with high safety.

The separator for a lithium secondary battery according to the present invention contributes to a lithium secondary battery with excellent safety because the separator includes the thermoplastic polymer porous sheet that provides a shutdown function by melting at a predetermined temperature and the aramid sheet that does not have a safety melting point and thus provides an excellent shape maintaining function.

Also, the separator of the present invention is easy to migrate ions due to a pore structure.

Furthermore, the separator of the present invention has a simple manufacturing method because it is manufactured by compression under a low pressure using an adhesive.

DESCRIPTION OF THE DRAWINGS

The accompanying drawing illustrates a preferred embodiment of the present disclosure and together with the foregoing disclosure, serves to provide further understanding of the technical spirit of the present disclosure. However, the present disclosure is not construed as being limited to the drawing.

DETAILED DESCRIPTION OF THE DISCLOSURE

Hereinafter, the present invention will be described in more detail. Prior to description, it should be understood that terms and words used in the specification and the appended claims should not be construed as having common and dictionary meanings, but should be interpreted as having meanings and concepts corresponding to technical ideas of the present invention in view of the principle that the inventor can properly define the concepts of the terms and words in order to describe his/her own invention as best as possible.

Figure 1:
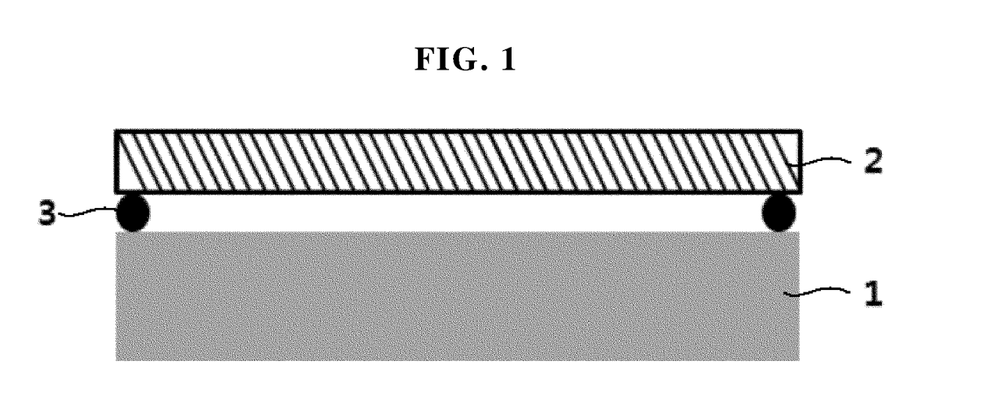
FIG. 1 is a schematic cross-sectional view of a separator according to an embodiment of the present invention.

FIG. 1 is a schematic cross-sectional view of a separator according to an embodiment of the present invention. Referring to FIG. 1, the separator according to the present invention includes a polyolefin-based polymer porous sheet 1 and an aramid-based non-woven fabric sheet 2 that are adhered with an adhesive 3.

The adhesive 3 of the present invention is characterized in that the adhesive 3 loses the adhesive performance at 80° C. or more. Generally, a majority of thermoplastic polyolefin-based polymers thermally shrink at 80° C. or more, however the separator of the present invention separates the polyolefin-based polymer porous sheet 1 from the aramid-based non-woven fabric sheet 2 at 80° C. or more to prevent the aramid-based non-woven fabric sheet 2 from being affected by the heat shrinkage of the polyolefin-based polymer porous sheet 1.

The adhesive 3 of the present invention may be applied over the entire surface of a sheet at target, however the adhesive 3 is preferably applied to only a portion of the entire surface of a sheet to obtain a peel-off effect.

The adhesive 3 usable in the present invention is not limited to a specific type of adhesive if it loses the adhesive performance at 80° C. or more. For example, the adhesive 3 that loses the adhesive performance at 80° C. or more may include, but is not limited to, a rubber-based adhesive, an acrylic adhesive, and combinations thereof. A rubber-based adhesive that is easy to peel off at a low temperature and a self-peeling acrylic adhesive are preferred in the present invention.

The polyolefin-based polymer porous sheet 1 of the present invention is easy to migrate ions since the polyolefin-based polymer porous sheet 1 has a pore structure. Preferably, the polyolefin-based polymer porous sheet 1 has a porosity of 30 to 80% and an air permeability of 100 to 400 sec/100 ml for easy ion movement.

Also, the polyolefin-based polymer porous sheet 1 of the present invention has a predetermined melting point depending on the specific material used since the polyolefin-based polymer porous sheet 1 is made from a thermoplastic polyolefin-based polymer. The polyolefin-based polymer porous sheet 1 having a predetermined melting point according to the present invention starts to melt when the temperature in the battery increases and reaches the melting point, and at the end, loses the pore structure in the polyolefin-based polymer porous sheet 1 to perform a shut-down function, thereby preventing ions from traveling. To perform a shut-down function, the thermoplastic polyolefin-based polymer porous sheet 1 of the present invention preferably has a melting point of 110 to 160° C.

The thermoplastic polyolefin-based polymer porous sheet 1 of the present invention may be any type of thermoplastic polyolefin-based polymer that can be used as a separator in the art, for example, including, but is not limited to, polyethylene, polypropylene, polybutene, polymethylpentene, and copolymers thereof.

The thermoplastic polyolefin-based polymer porous sheet 1 of the present invention may have a thickness of 8 to 30 μm, however this is for the purpose of illustration only. In consideration of the mechanical properties or high-rate charging/discharging characteristics of the battery, a thickness out of the range may be also employed.

The aramid-based non-woven fabric sheet 2 of the present invention has a micropore structure that is intrinsic to a non-woven fabric. Accordingly, the aramid-based non-woven fabric sheet 2 is easy to migrate ions.

Also, the aramid-based non-woven fabric sheet 2 of the present invention is not liable to thermal deformation due to the intrinsic properties of aramid. The aramid-based non-woven fabric sheet 2 of the present invention does not substantially have a safety melting point. For example, the safety melting point may be, but not limited to, 400° C. or more. Accordingly, the aramid-based non-woven fabric sheet 2 is not subject to thermal deformation even when the temperature in the battery is high, thereby maintaining the isolation between electrode plates and consequently preventing an internal short circuit.

Preferably, the aramid-based non-woven fabric sheet 2 of the present invention has a porosity of 40 to 70% and an air permeability of 1 to 20 sec/100 ml for easy ion movement.

The aramid-based non-woven fabric sheet 2 of the present invention may have a thickness of 2 to 20 μm, however this is for the purpose of illustration only. Based on the permeability of the aramid-based non-woven fabric sheet 2, a thickness out of the range may be also employed.

Figure 2:
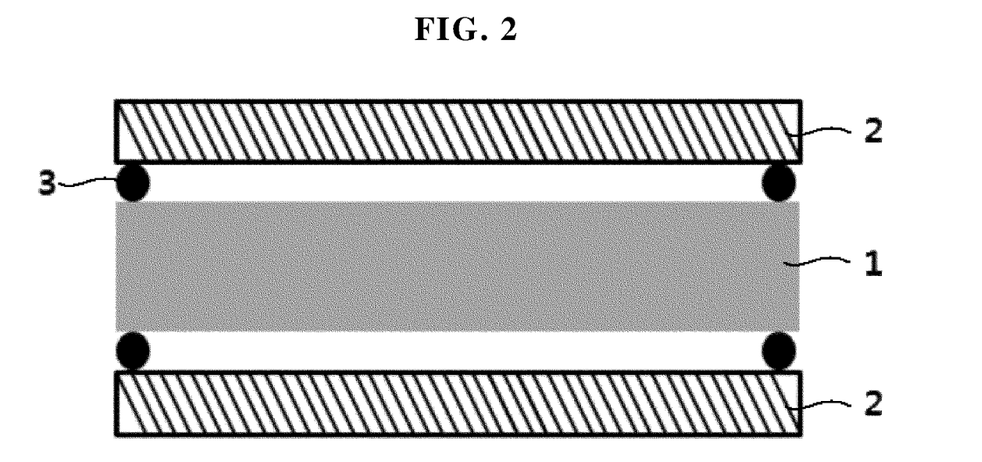
FIG. 2 is a schematic cross-sectional view of a separator according to another embodiment of the present invention.

Optionally, the separator of the present invention may have a multi-stack structure of the thermoplastic polyolefin-based polymer porous sheet 1 and the aramid-based non-woven fabric sheet 2. For example, the aramid-based non-woven fabric sheet 2 may be attached to both surfaces of the polyolefin-based polymer porous sheet 1. An embodiment of this structure is schematically illustrated in FIG. 2.

Preferably, the separator of the present invention has a porosity of 40 to 60% and an air permeability of 150 to 300 sec/100 ml for easy movement of ions.

Also, the separator of the present invention preferably has a thickness of 10 to 50 μm. When the thickness is less than 10 μm, the separator does not sufficiently perform its function, resulting in deterioration of the mechanical properties. When the thickness exceeds 50 μm, the characteristics of the battery may deteriorate during high-rate charging/discharging.

The separator of the present invention may be interposed between a cathode and an anode to fabricate a lithium secondary battery. A method for fabricating a lithium secondary battery according to an embodiment of the present invention is described below.

First, an electrode active material layer is formed on a current collector using an electrode active material composition containing an electrode active material, a binder, a solvent, and optionally a conductive material. In this instance, the electrode active material layer may be formed by directly coating the electrode active material composition onto the current collector or by coating the electrode active material composition on a separate support, drying the composition, peeling off a resulting film, and laminating the film on a current collector. Here, the support is not limited to a specific type of support if it can support an active material layer. For example, the support may include a Mylar® film and a polyethyleneterephthalate (PET) film.

The electrode active material, the binder, the conductive material, and the solvent may be ones conventionally used in fabricating a lithium secondary battery.

Specifically, the cathode active material may include lithium-containing metal oxide, such as, for example, $LiCoO_2$, $LiNiO_2$, and $LiMn_2O_4$, and lithium-containing metal oxide obtained by adding Co, Ni, or Mn to the above lithium-containing metal oxide, such as, for example, $LiNi_{1-x}Co_xO_2$ ($0 \leq x \leq 1$). Also, the cathode active material may include sulfide, selenide, and halide, as well as the exemplary oxide above. The anode active material may generally include a carbon material. For example, the carbon material usable in the present invention may include low crystallinity carbon and high crystallinity carbon. Representatively, low crystallinity carbon includes soft carbon and hard carbon, and high crystallinity carbon includes high-temperature sintered carbon, such as, for example, natural graphite, Kish graphite, pyrolytic carbon, mesophase pitch based carbon fiber, mesocarbon microbeads, Mesophase pitches, and petroleum pitch derived cokes or coal tar pitch derived cokes. The carbon material may have an average particle size of a conventional anode active material. For example, the average particle size may be, but not limited to, 3 to 60 μm.

The binder may include, for example, vinylidenefluoride-hexafluoropropylene copolymer (PVDF-co-HFP), polyvinylidenefluoride, polyacrylonitrile, polymethylmethacrylate, and mixtures thereof. The conductive material may include, for example, carbon black and acetylene black. The solvent may include, for example, acetone and N-methylpyrrolidone.

After electrodes are made as described above, the separator is interposed between the cathode plate and the anode plate to manufacture an electrode assembly. Subsequently, the electrode assembly is put in a casing and an electrolyte for a lithium secondary battery is injected. The lithium secondary battery of the present invention is completed.

Hereinafter, various preferred examples of the present invention will be described in detail for better understandings. However, the examples of the present invention may be modified in various ways, and they should not be interpreted as limiting the scope of the invention. The examples of the present invention are for persons having ordinary skill in the art to have a better understanding of the invention.

Example 1

Preparation of Separator

An acrylic adhesive, NW-106 (TEMPLOC, DENKA), was sprayed onto the edges of both surfaces of a polyethylene sheet (W-able) having 16 μm thickness, 40% porosity, and 150.2 sec/100 ml permeability. An aramid sheet having 6 μm thickness, 47% porosity, and 1.8 sec/100 ml permeability was attached to both surfaces of the polyethylene sheet. The result was compressed using rolls under 60 psi pressure at room temperature to obtain a separator having 28 μm thickness, 47% porosity, and 237 sec/100 ml permeability.

<Fabrication of Lithium Secondary Battery>

A cathode active material, $LiNi_{(1-x-y)}Mn_xCo_yO_2$ (0≤x, 0≤y, 0≤x+y≤1) and an anode active material, MGP (China Steel Chemical Corporation) were used. The prepared separator was interposed between a cathode and an anode, and an aluminum casing was applied thereto. A lithium secondary battery was completed and had a dimension of 100 mm (thickness)×216 mm (width)×216 mm (length) and a design capacity of 40 Ah.

Comparative Example 1

The same process as Example 1 was repeated to fabricate a lithium secondary battery except that only a polyethylene sheet having 16 μm thickness, 40% porosity, and 225 sec/100 ml permeability was used as a separator.

Comparative Example 2

The same process as Example 1 was repeated to fabricate a lithium secondary battery except that only an aramid sheet having 19 μm thickness, 63% porosity, and 1.1 sec/100 ml permeability was used as a separator.

Comparative Example 3

The same process as Example 1 was repeated to fabricate a lithium secondary battery except that only a polymer blend sheet of polyethylene polymer and polyethylene oligomer having 20 μm thickness, 43% porosity, and 170 sec/100 ml permeability was used as a separator.

Figure 3:
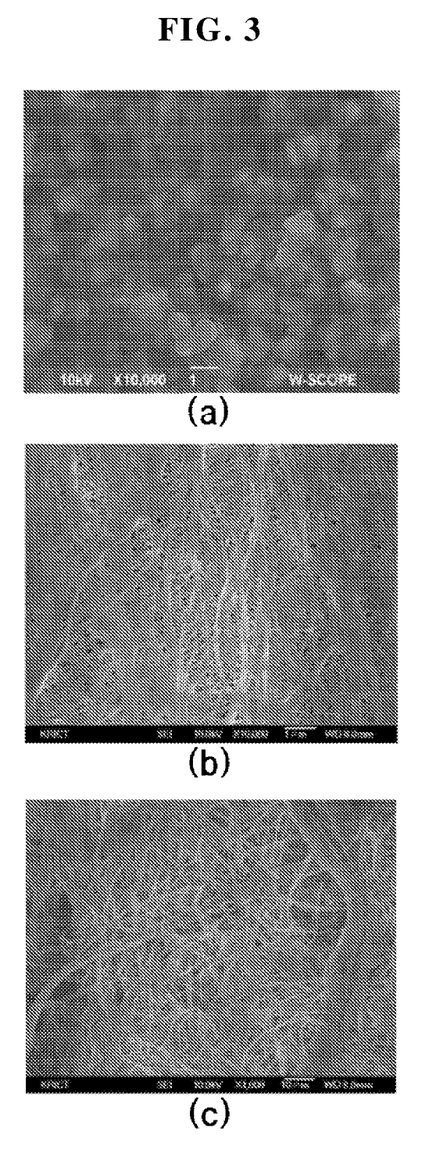
FIG. 3 is a scanning electron microscopy (SEM) image of a separator; (a) a separator of Example 1, (b) a separator of Comparative Example 1, and (c) a separator of Comparative Example 2.

FIG. 3 is a scanning electron microscopy (SEM) image of the separator; (a) the separator of Example 1, (b) the separator of Comparative Example 1, and (c) the separator of Comparative Example 2.

Evaluation of Characteristics

1. Electrochemical Characteristics

The batteries fabricated according to examples and comparative examples were charged at 8 A (0.2 C) to 4.2V under constant current-constant voltage (CC-CV) conditions, allowed to rest for 10 minutes, and then discharged at 20 A (0.5 C) to 2.7V, by using a charge/discharge cycle device. The charge capacity, discharge capacity, initial specific capacity, and initial efficiency of each battery are shown in Table 1 below.

TABLE 1

|  | Charge capacity [Ah] | Discharge capacity [Ah] | Specific capacity [mAh/g] | Efficiency [%] |
|---|---|---|---|---|
| Example 1 | 47.56 | 40.38 | 150.94 | 84.9 |
| Comparative Example 1 | 47.58 | 40.33 | 151.03 | 84.8 |
| Comparative Example 2 | 76.03 | 40.68 | 152.35 | 53.5 |
| Comparative Example 3 | 49.79 | 41.50 | 150.11 | 83.3 |

As shown in Table 1 above, it was found that the separator of Example 1 showed the charge/discharge performance similar to those of Comparative Examples, except that the separator of Comparative Example 2 using only an aramid sheet doubled the charge capacity but reduced in the efficiency when compared with the others.

2. Heat Shrink Test

The separators prepared in examples and comparative examples were observed for shape maintenance using a hot air oven. After the separators were placed in the hot air oven for 1 hour, the shrinkage of the separators was determined. The test results are shown in Table 2 below.

TABLE 2

|  | Example 1 | Comparative Example 1 | Comparative Example 2 | Comparative Example 3 |
|---|---|---|---|---|
| Machine Direction (MD) | 6.5% | 37.0% | 0% | 18.5% |
| Transverse Direction (TD) | 3.7% | 51.9% | 0% | 24.1% |

As shown in Table 2 above, it was found that the separator of Example 1 showed smaller heat shrinkage and consequently superior shape maintenance performance than those of Comparative Examples exclusive of Comparative Example 2 using only an aramid sheet.

3. Safety Test

An overcharge test and a nail penetration test were carried out on the batteries fabricated using the sheets of Example and Comparative Examples. The overcharge test was made to determine the voltage behavior and surface temperature of the batteries after charging the batteries at 80 A (2.0 C) to 12V. The nail penetration test was made to determine the voltage behavior and surface temperature of the batteries after passing a nail with a diameter of 5φ through the batteries at 60 mm/sec.

The determined surface temperature of the batteries according to the test is shown in Table 3 below.

Figure 4:
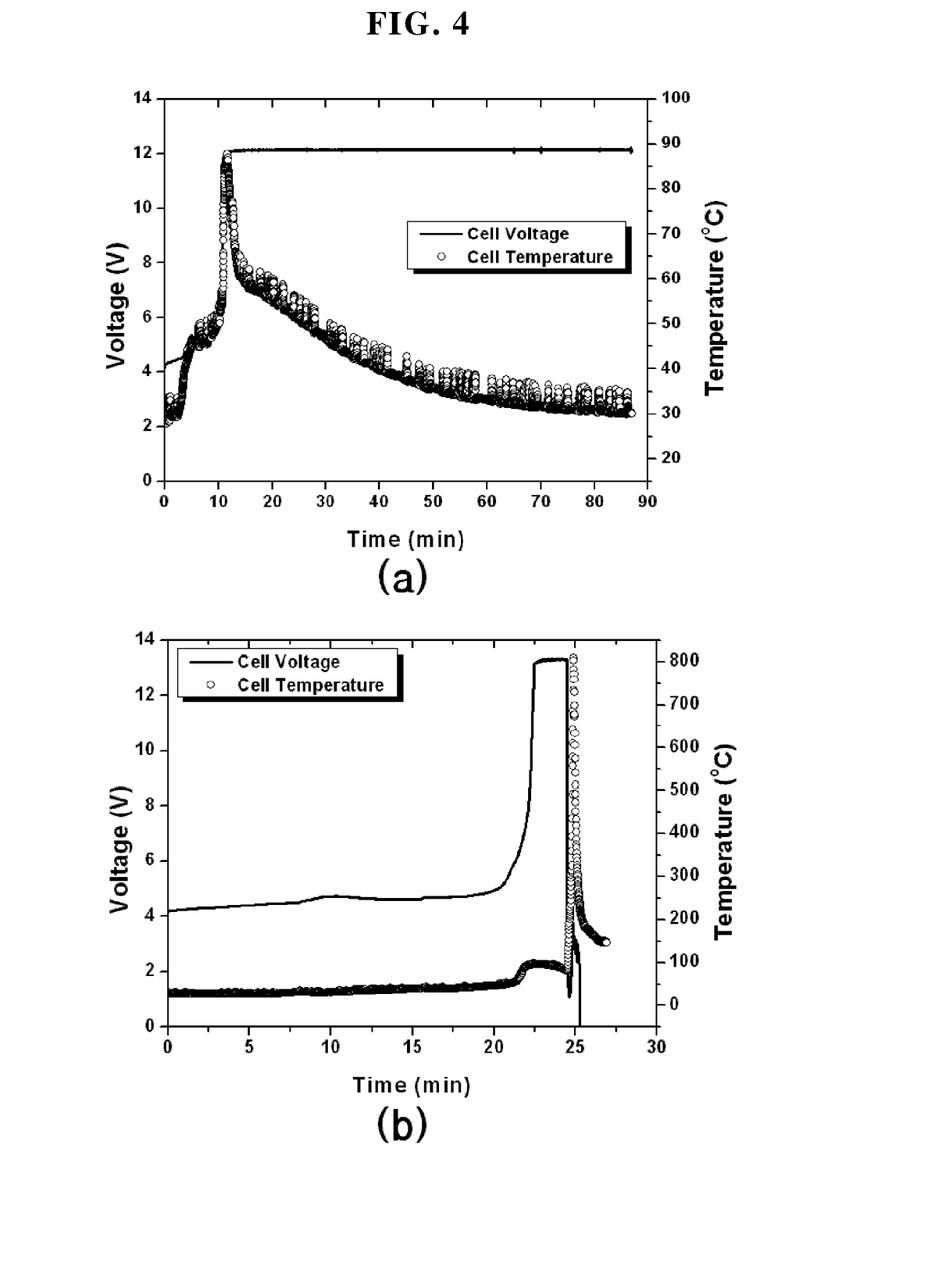
FIG. 4(a) is a graph showing the changes in voltage behavior of a battery of Example 1 when overcharged.
FIG. 4(b) is a graph showing the changes in surface temperature of a battery of Comparative Example 2 when overcharged.
Figure 5:
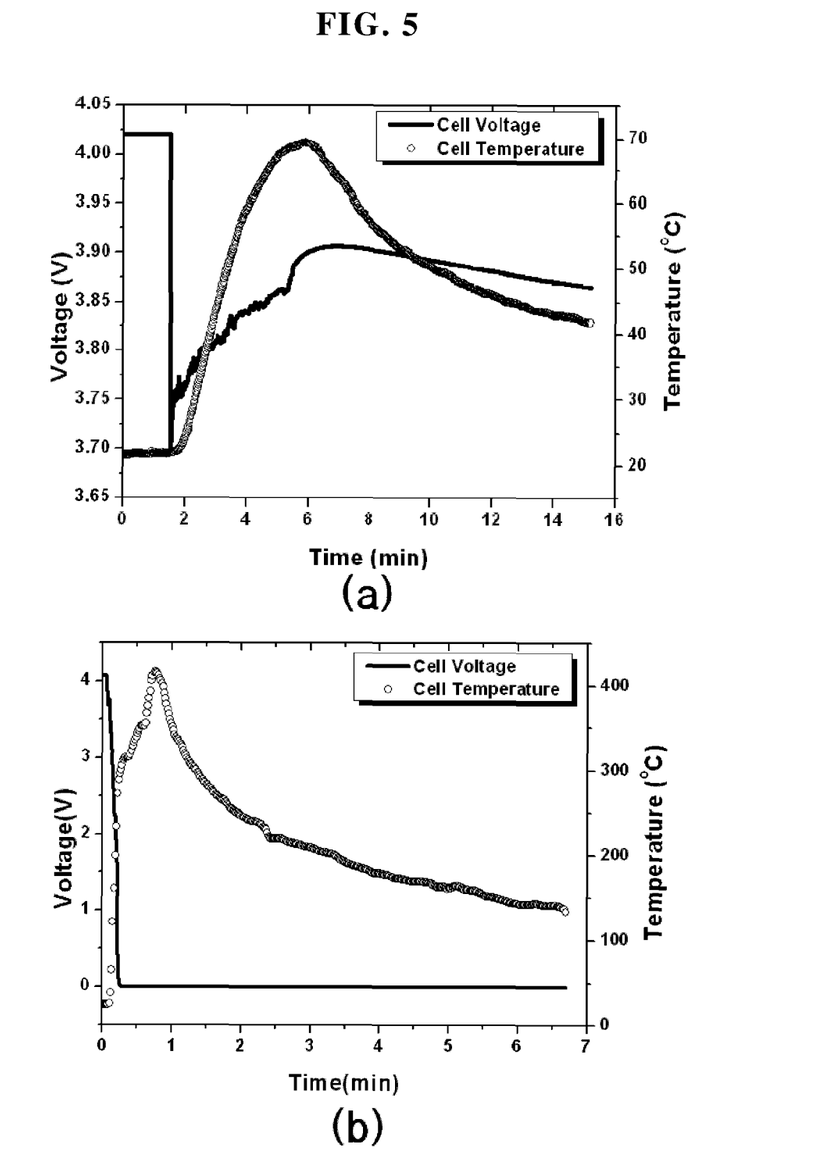
FIG. 5(a) is a graph showing the changes in voltage behavior of a battery of Example 1 after a nail penetration test.
FIG. 5(b) is a graph showing the changes in surface temperature of a battery of Comparative Example 3 after a nail penetration test.

FIG. 4(a) is a graph showing the changes in voltage behavior of the battery of Example 1 after the overcharge test; and FIG. 4(b) is a graph showing the changes in surface temperature of the battery of Comparative Example 2 after the overcharge test. FIG. 5(a) is a graph showing the changes in voltage behavior of the battery of Example 1 after the nail penetration test; and FIG. 5(b) is a graph showing the changes in surface temperature of the battery of Comparative Example 3 after the nail penetration test.

TABLE 3

|  | Overcharge | Nail Penetration |
| --- | --- | --- |
| Example 1 | A, 85° C. | A, 69° C. |
| Comparative Example 1 | C, 190° C. | D, 550° C. |
| Comparative Example 2 | D, 800° C. | A, 26° C. |
| Comparative Example 3 | A, 75° C. | D, 420° C. |

A: no change,
B: smoke,
C: ignition,
D: explosion

As shown in Table 3 above, because the separator of Comparative Example 2 using only an aramid sheet does not have a safety melting point, after the nail penetrated the battery, the separator of Comparative Example 2 does not deform by the heat generated in the battery even though a short circuit occurs in the battery, thereby preventing further heat from generating. Accordingly, the separator of Comparative Example 2 is found to be safe. However, because the separator of Comparative Example 2 does not have a shut-down function, when overcharged, the separator of Comparative Example 2 may explode due to an internal short circuit resulting from the deposition of lithium metal on the anode.

On the other hand, the separators of Comparative Examples 1 and 3 using only a thermoplastic polymer porous sheet perform a shut-down function at a predetermined temperature or more to shut down a flow of electric current introduced into the battery and exhibit small heat shrinkage at a high temperature due to the pore structure, thereby avoiding the internal short circuit hazard. However, the nail penetration test involves the heat generation around the nail. The heat makes the separator shrink, causing an internal short circuit and further heat generation thereby, which results in failure to ensure safety.

However, since the separator of Example 1 has both a shut-down function of the thermoplastic polymer sheet and the shape maintenance performance of the aramid sheet, the separator of Example 1 is excellent in the safety. In particular, the separator of Example 1 is featured in that the sheets are adhered with an adhesive and the adhesion is released at 80° C. or more. Even though the thermoplastic polymer sheet deforms when overcharged, the aramid sheet can maintain the shape, thereby preventing an internal short circuit and ensuring safety.

What is claimed is:

1. A separator for a lithium secondary battery, the separator comprising:
    a thermoplastic polyolefin-based polymer porous sheet; and
    an aramid-based non-woven fabric sheet stacked on both surfaces of the polyolefin-based polymer porous sheet,
    wherein the polyolefin-based polymer sheet and the aramid-based non-woven fabric sheet are adhered with an adhesive, the adhesive is applied onto the edges of both surfaces of the polyolefin-based polymer porous sheet, and the adhesive loses an adhesive performance at 80° C. or more to separate the two sheets.

2. The separator for a lithium secondary battery according to claim 1, wherein the polyolefin-based polymer sheet is a sheet of at least one selected from the group consisting of polyethylene, polypropylene, polybutene, polymethylpentene, and copolymers thereof.

3. The separator for a lithium secondary battery according to claim 1, wherein the polyolefin-based polymer sheet has a melting point of 110 to 160° C.

4. The separator for a lithium secondary battery according to claim 1, wherein the polyolefin-based polymer sheet has a porosity of 30 to 80%.

5. The separator for a lithium secondary battery according to claim 1, wherein the polyolefin-based polymer sheet has an air permeability of 100 to 400 sec/100 ml.

6. The separator for a lithium secondary battery according to claim 1, wherein the aramid-based non-woven fabric sheet has a porosity of 40 to 70%.

7. The separator for a lithium secondary battery according to claim 1, wherein the aramid-based non-woven fabric sheet has an air permeability of 1 to 20 sec/100 ml.

8. The separator for a lithium secondary battery according to claim 1, wherein the separator has a porosity of 40 to 60%.

9. The separator for a lithium secondary battery according to claim 1, wherein the separator has an air permeability of 150 to 300 sec/100 ml.

10. The separator for a lithium secondary battery according to claim 1, wherein the separator has a thickness of 10 to 50 µm.

11. A lithium secondary battery comprising:
    a cathode;
    an anode; and
    a separator interposed between the cathode and the anode, wherein the separator is defined in claim 1.

* * * * *